United States Patent [19]

Elliott

[11] Patent Number: 4,703,467
[45] Date of Patent: Oct. 27, 1987

[54] VIDEO DISC READ BACK SCANNER

[75] Inventor: James E. Elliott, San Pedro, Calif.

[73] Assignee: Discovision Associates, Costa Mesa, Calif.

[21] Appl. No.: 489,923

[22] Filed: Apr. 29, 1983

Related U.S. Application Data

[60] Division of Ser. No. 290,261, Aug. 3, 1981, Pat. No. 4,451,913, which is a continuation of Ser. No. 924,538, Jul. 14, 1978, Pat. No. 4,282,598, which is a continuation-in-part of Ser. No. 812,180, Jul. 1, 1977, abandoned, which is a continuation of Ser. No. 662,238, Feb. 27, 1976, abandoned, which is a continuation-in-part of Ser. No. 465,823, May 1, 1974, Pat. No. 3,944,727, which is a division of Ser. No. 299,893, Oct. 24, 1972, Pat. No. 3,829,622.

[51] Int. Cl.⁴ ............................................. G11B 7/095
[52] U.S. Cl. ..................................... 369/44; 369/111; 250/202; 360/77
[58] Field of Search .................. 369/44, 111; 250/202; 360/77

[56] References Cited

U.S. PATENT DOCUMENTS

| | | | |
|---|---|---|---|
| 2,838,683 | 6/1958 | Munro | 250/202 |
| 3,138,669 | 6/1964 | Rabinow | 179/100.3 V |
| 3,287,563 | 11/1966 | Clunis | 179/100.3 V |
| 3,314,075 | 4/1967 | Becker . | |
| 3,363,054 | 1/1968 | Mason | 179/100.3 V |
| 3,381,085 | 4/1968 | Johnson | 178/6.7 A |
| 3,381,086 | 4/1968 | Moss . | |
| 3,530,258 | 9/1970 | Gregg | 369/111 |
| 3,534,166 | 10/1970 | Korpel | 369/111 |
| 3,567,855 | 3/1971 | Hamisch | 179/100.3 V |
| 3,612,642 | 10/1971 | Dostal | 350/285 |
| 3,638,185 | 1/1972 | Dell . | |
| 3,654,624 | 4/1972 | Becker | 346/76 L |
| 3,657,707 | 4/1972 | McFarland . | |
| 3,715,524 | 2/1973 | Adler | 178/6.7 A |
| 3,737,877 | 6/1973 | Feinleib | 340/173 LT |
| 3,774,172 | 11/1973 | Silverman | 369/44 |
| 3,798,386 | 3/1974 | Dickopp | 179/100.3 V |
| 3,860,766 | 1/1975 | Mori | 179/100.41 L |
| 3,876,827 | 4/1975 | Janssen | 179/100.3 V |
| 3,944,727 | 3/1976 | Elliott | 179/100.3 V |

OTHER PUBLICATIONS

Laser recording unit by McFarland et al, Fall Joint Computer Conf., ©1968.
"An Experimental Television Recording and Playback System Using Photographic Discs", by Rice et al, pp. 997-1002; Nov., 1970, Journal of the SMPTE, vol. 79; 179-100.3V.

Primary Examiner—Alan Faber
Attorney, Agent, or Firm—Discovision Associates

[57] ABSTRACT

A video signal play back device derives video signals from successive tracks formed as a continuous spiral on a video disc using a light source and a lens system, which is carried by a rotatable element at a predetermined spacing from the surface of the disc and which defines a folded optical path. The rotatable element translates the lens system in the radial direction relative to the disc for "coarse" steering of the light beam along the information tracks as the disc is rotated by a turntable. The optical path includes a mirror which is articulated for rotational motion about an axis which shifts the point of impingement of the transmitted light beam upon the disc in the radial direction. The returned beam is directed to a photosensitive pick-up which provides input signals to a circuit which generates a "fine" servo control signal to drive the articulated mirror.

7 Claims, 5 Drawing Figures

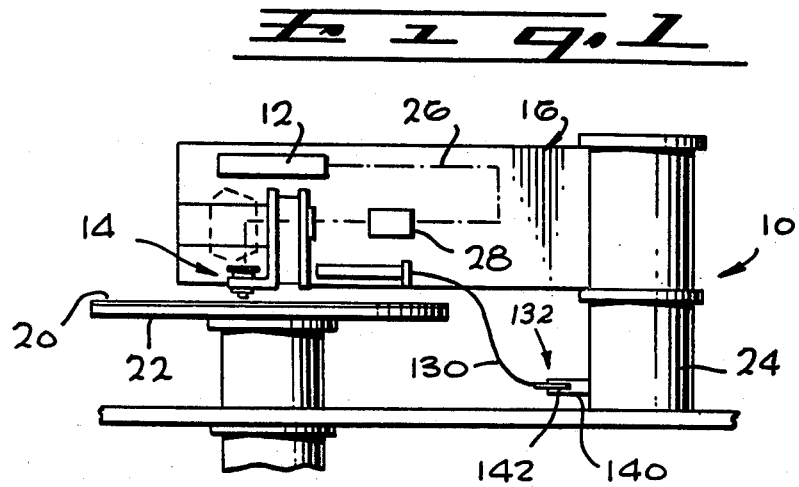
Fig. 1
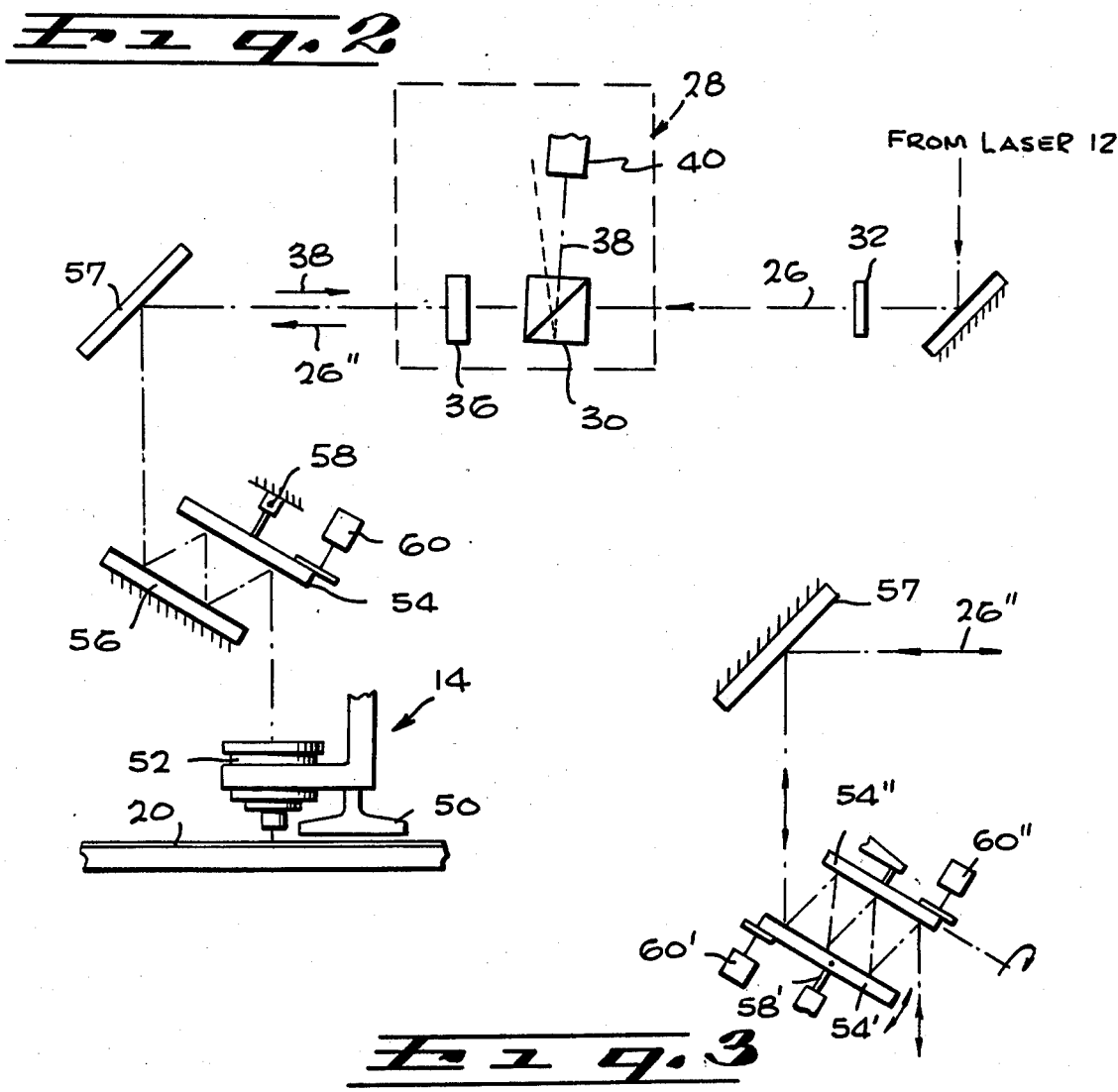
Fig. 2
Fig. 3

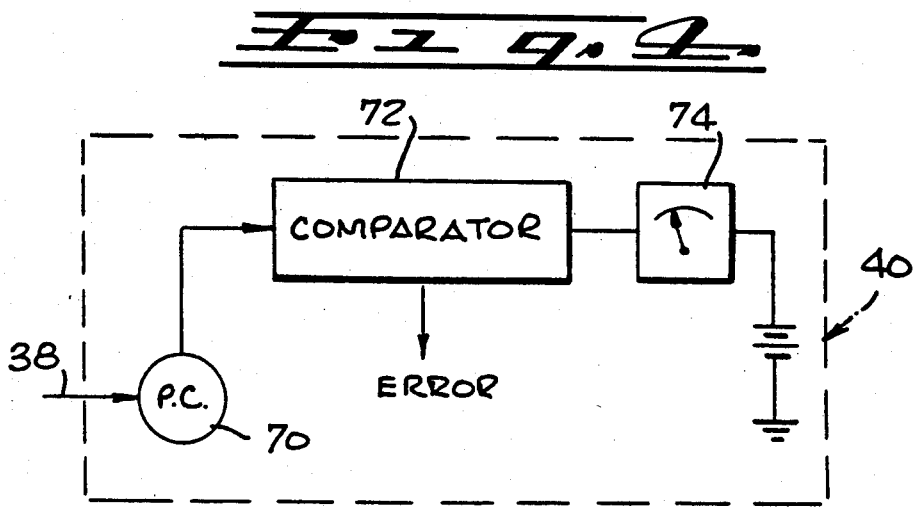
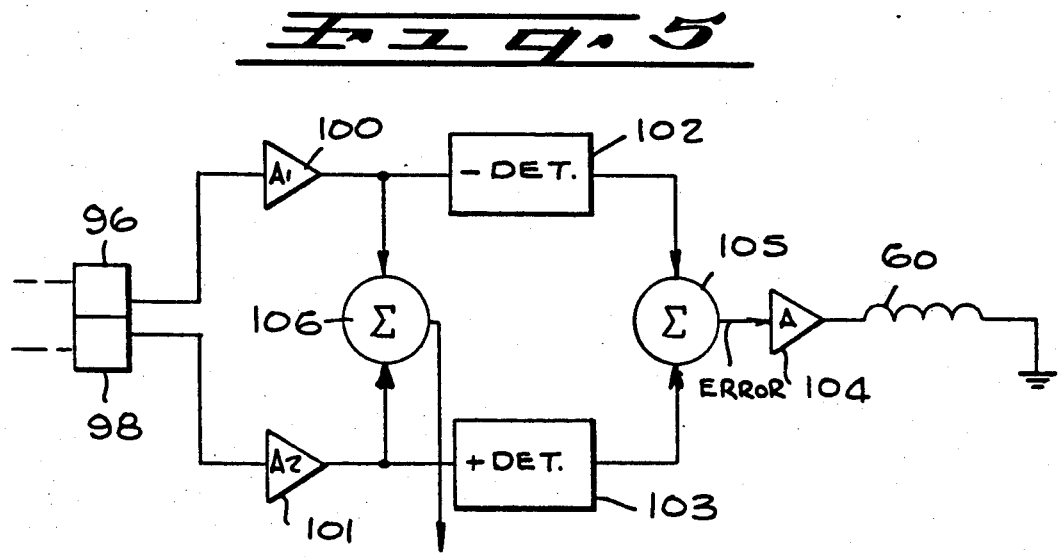

VIDEO DISC READ BACK SCANNER

CROSS-REFERENCES TO RELATED APPLICATIONS

This is a continuation-in-part of a copending application Ser. No. 290,261, filed Aug. 3, 1981, now U.S. Pat. No. 4,451,913 which was a continuation of application Ser. No. 924,538, filed July 14, 1978, now U.S. Pat. No. 4,282,598, and which was a continuation-in-part of application Ser. No. 812,180, filed July 1, 1977, now abandoned, which was a continuation of application Ser. No. 662,238, filed Feb. 27, 1976, now abandoned, which was a continuation-in-part of a streamlined divisional application Ser. No. 465,823, filed May 1, 1974, now U.S. Pat. No. 3,944,727, which was divided from application Ser. No. 299,893, filed Oct. 24, 1972, now U.S. Pat. No. 3,829,622. Each of the foregoing applications and issued patents is assigned to the assignee of the present application.

BACKGROUND OF THE INVENTION

1. Field of the Invention

Systems have heretofore been developed for reproducing signals at video frequencies from information recorded on discs, tapes, or other media. Such systems have utilized, among other things, optical recordings upon photosensitive discs, electron beam recording on thermo plastic surfaces and, in prior patents assigned to the assignee of the present invention, systems utilizing a rotating disc which is responsive to impinging radiation to reflect or transmit radiation corresponding to and representative of the information stored on the surface of the disc.

For example, in U.S. Pat. No. 3,530,258, issued to David Paul Gregg and Keith O. Johnson on Sept. 22, 1970, there was shown and described a system in which a video signal transducer included a servo controlled pair of flexible, fibre optic elements. An air bearing supported an objective lens system. A light source of radiant energy was positioned below the disc and the transducer was responsive to transmitted light.

Other patents have shown the use of a radiant source which directed an energy beam to the surface of the disc and provided a transducer that was responsive to reflected energy. One of the major problems to be encountered in the recording and reproduction of video information, arises directly from a consideration of the energy levels involved in such a process and the restraints imposed by the considerations of size, weight and operating conditions.

To be commerically desriable as a home instrument, the system should be able to store and reproduce a "program" of at least 15 to 30 minutes in length. The record disc should be of an easily handled size, comparable to the phonograph records currently in use. If the playback turntable was operated at 1800 rpm, some 54,000 revolutions would provide 30 minutes of playback. Assuming a 1 micron track width and 1 micron spacing between adjacent tracks, a circular band approximately 4.25 inches wide is required. Assuming that the smallest radius at which information can be stored is approximately three inches, the resultant disc is about 15 inches in diameter. The duration of the program or the speed of the turntable can change the dimensions of the recorded area, as can the width of the individual track and the spacing between adjacent tracks.

Assuming that the video information has been recorded in some digital fashion, the presence or absence of a signal can be detected at an appropriate information rate. If the width of the track is approximately one micron, and the space between adjacent tracks is also one micron, the quantity of energy necessary to impart information from the disc can be determined. It is necessary to provide sufficient radiant energy to "illuminate" a "spot" of approximately one micron in diameter and, at the same time, provide sufficient radiant energy at the detector, so that the "presence" or "absence" of a signal can be distinguished.

It has been discovered, in attempting to utilize the transmitted radiation techniques of the prior art, that the provision of an inordinately large amount of radiation into the system is required in order to "transmit" a sufficiently useful increment of energy for detection through the record. It has also been determined that a substantial magnification is required to enable a state-of-the-art transducer to respond to a one micron diameter radiant spot.

If a light source illuminates the entire field which can be scanned by the detector under control of the servo system, it will be seen that an extraordinary light intensity must be provided before the light transmitted through or reflected from the disc will be of sufficient intensity to register upon the photosensitive device.

In a preferred emobodiment of the present invention, an articulated mirror is utilized with a highly collimated source, to move the point of impingement of the radiant spot upon the disc. An important aspect of the present invention is the ability to direct or "steer" the illuminating radiation to a particular spot and to return the information from the spot thus illuminated to a detector system.

An important aspect of the present invention is the ability to direct the illuminating radiation to a particular spot and to return the information from the spot thus illuminated to a detector system. The prior art has suggested the use of a pair of transducers in conjunction with a summing amplifier to provide signal information and a differential amplifier to provide feedback servo information for error correction. However, given the limitations of the extremely low radiation levels, the diffraction limited characteristics of the image and the extreme sensitivity of the system to noise and vibration, such an approach is not entirely satisfactory. A difference "curve following" technique described in the patent to W. D. Munro, U.S. Pat. No. 2,838,683, issued June 10, 1958, has suggested an alternative solution.

In the preferred embodiment therefore, a single photosensitive pickup is used as one input to a differential amplifier, and a second input is provided from a fixed bias source. The bias is adjusted to balance the input of the photodetector when it is illuminated by the reflected spot that is approximately half way into the information track, for example, on the periphery side of the track. If the intensity of the radiation upon the detector increases in a system where the track is "darker" than the band between "tracks", then a servo signal is developed to drive the mirror in a first direction, tending to move the spot toward the track and toward the center. Similarly, if the radiation decreases, the relatively higher magnitude of the bias causes an error signal to be generated which moves the mirror and the "spot" in a respectively opposite direction, away from the track and toward the periphery.

Since, in the preferred emobodiment, one revolution of the disc represents one "frame" of the T.V. picture, an error in tracking, where the track is "lost", merely results in either the skipping or the repeating of a frame, both of which are undetectable by the human observer. In alternative embodiments, it is possible to use the earlier prior art technique of the photodetector pair.

A second, articulated mirror may be provided which rotates in a second direction, orthogonal to the direction used for the radial steering of the beam and tracking of the image. Such steering may be considered to be in the circumferential direction and would aid in the synchronization and timing of the recorded information with respect to the timing frequencies generated in the reproducer circuits. As is known, television circuits, and especially color television circuits, require extremely accurate time synchronization in order to maintain color fidelity. Therefore, any error in synchronism between the local oscillator of the reproduction apparatus and the timing information recorded on the disc, may be resolved and eliminated through the use of mirror motion in the second direction.

It has been found that any errors resulting from eccentricity of the disc can be simply corrected. It will be noted that the steering and tracking circuit which maintains the radiant spot on the appropriate spiral track will undergo some periodic signal fluctuation that is related to eccentricity. It can then be shown that the change in instantaneous velocity in the circumferential direction also changes in substantially similar fashion, but lags by one-quarter revolution of the disc. Therefore, it is possible either to sense the velocity changes from the recorded timing information and from this derive a correcting signal to drive the tracking servos, or to sense the eccentricity from the tracking servo and use that signal with an appropriate phase shift to drive the "timing" servo to correct for velocity changes due to eccentricity. In an alternative embodiment, a single axis articulated mirror corrects for tracking and electronic circuits compensate for timing errors.

Accordingly, it is an object of the present invention to provide an improved playback assembly for a disc upon which video information has been recorded.

It is yet another object of the invention to provide an improved tracking circuit for optically scanning a video disc.

It is yet a different object of the invention to provide a video disc playback assembly which directs a radiant spot to the surface of the disc and directs the returning radiation to a photosensitive detector, which detects returning radiation from the disc surface.

The novel features which are believed to be characteristic of the invention, both as to organization and method of operation, together with further objects and advantages thereof will be better understood from the following description considered in connection with the accompanying drawings in which several preferred embodiments of the invention are illustrated by way of example. It is to be expressly understood, however, that the drawings are for the purpose of illustration only and are not intended as a definition of the limits of the invention.

BRIEF DESCRIPTION OF THE DRAWINGS

FIG. 1 is an idealized side view of a playback assembly according to the present invention;

FIG. 2 is a more detailed block diagram of the elements in the optical playback system;

FIG. 3 is an idealized view of an alternative articulated mirror assembly;

FIG. 4 is a block diagram of a suitable detector and tracking circuit of the prior art; and FIG. 5 is a block diagram of an optical detector of the prior art suitable for use in the present invention.

DESCRIPTION OF THE PREFERRED EMBODIMENTS

Turning first to FIG. 1, there is shown, in side view a playback assembly 10 suitable for use in the present invention. The playback assembly 10 includes a laser element 12 which moves with the playback assembly 10. It is, however, within the state-of-the-art to provide a stationary laser which is coupled optically to the movable assembly 10. Preferably, the laser 12 provides coherent, polarized light. A read head 14 is mounted in arm 16 of the playback assembly 10.

A video disc, 20, which has video information recorded upon it is mounted on a turntable 22, which is adapted to rotate the disc 20 at a relatively high speed. In the preferred embodiment, the turntable speed is set at 1800 rpm.

Suitable video discs have been described and claimed in the patents to Gregg, Johnson, supra.

The playback assembly 10 is mounted on a rotatable element 24 which, in the view of FIG. 1, translates the reading head in the radial direction relative to the disc 20 and in an arc that is generally orthogonal to the plane of the drawing.

The laser 12 generates a reading beam 26 which generally passes from the laser 12 through an optical system to the playback head 14. The beam is then directed to the surface of the disc 20 and returns through the playback head 14 along the same optical path until a read assembly 28 is encountered. The read assembly 28 is mounted on the arm 16.

In operation, the laser directs a reading light beam 26 to the surface of the disc 20 through the optical system. The information recorded upon the disc interacts with the impinging beam and a reflected beam is produced which contains the recorded information. The reflected light beam is returned to the optical system which "analyzes" the returned beam to determine whether the beam is properly tracking the signal channel.

If the electronics determine that the laser spot is not being directed to a predetermined area of the information channel, appropriate servo signals are derived which, when applied to the read head 14, cause the point of impingment of the laser beam to shift in the radial direction to retain alignment with the track that is being read.

In an alternative embodiment, the driver for the rotatable element 24 for the playback assembly 10 can also be controlled by the servo signals which changes the position of the laser spot. In yet another embodiment, a motor can be coupled to the turntable driver to provide a predetermined increment of radial motion for each revolution of the turntable 22. In any case, the playback head 10 can be made to track the information channel recorded on the disc 20 with a "coarse" adjustment being applied to the driver of the rotatable element 24 and a "fine" adjustment being applied to an articulated mirror, described in greater detail below.

Turning next to FIG. 2, there is shown a diagram of the elements of the reading system. The reading laser beam 26 is applied to a beam splitting prism 30. The prism 30 is rotated slightly with respect to the optical path. A lens 32 is provided to better form the beam 26 at the surface 20 and to optimize the resolving power of the system. The transmitted portion of the beam 26 is applied through a quarter wave plate 36 and is then directed through the reading head 14 to the disc.

A returning beam 38 containing the information from the disc 20 follows substantially the identical path. At the quarter wave plate 36, the returning beam is now given an additional quarter wave shift for a total polarization of one-half wavelength. The returning beam 38 reaches the beam splitter 30 and is reflected therefrom to a suitable optical system 40. Light from the laser 12 that is initially reflected in the prism 30 and re-reflected from the base of the prism will, due to the slight rotation of the prism 30, be aimed at a point that wholly misses the detector 40. Moreover, the cumulative effect of the quarter wave plate which polarizes the returning beam by one-half wavelength substantially attenuates any transmitted component. What is transmitted is cross polarized with respect to the laser 12.

The read head 14 includes a fluid-bearing member 50 which is adjacent to and supportive of a microscope objective lens 52. A limited amount of vertical adjustment is available in the objective lens 52. Directing the illumination to the objective lens 52 is an articulated mirror 54 which is mounted adjacent to and cooperates with a second or fixed mirror 56 that is substantially parallel with the articulated mirror 54. The fixed mirror receives the reading beam 26 and directs it to the articulated mirror 54.

The reading beam 26 undergoes at least one reflection from the articulated mirror 54 before the beam is applied to the objective lens 52. Two such reflections are illustrated in the embodiment of FIG. 2. Similarly, the beam path is such that a reflected beam 38 returning from the surface of the disc 20 would also undergo two reflections from the articulated mirror 54 and two reflections from the fixed mirror 56 before proceeding into the optical path including an additional fixed mirror 57, disposed at the point of deflection between the third and fourth path portions, which ultimately leads to the read assembly 28.

In the embodiment illustrated, the articulated mirror 54 is mounted on a point pivot 58 that is centrally located with respect to the mirror 54. The mirror 54 may have an oblong shape with the long axis in the plane of the drawing and the short axis orthogonal to the plane of the drawing. As shown, a mirror driver 60 is connected to one end of the mirror 54 and is operable to impart motion about the central pivot 58.

If the driver 60 rotates the mirror 54 in the clockwise direction, as viewed in FIG. 2, the point of impingement of the read beam 26 will be shifted to the left. This would represent a deflection of the beam in a first radial direction. If the driver 58 rotates the mirror 54 in the counter-clockwise direction, then the point of impingement of the transmitted beam 26 will be shifted to the right, as seen in FIG. 2, or in a second, opposite radial direction.

It will be obvious that the reflected beam 38 and the reading beam 26 trace identical paths between the surface of the disc 20 and the beam splitter 30. The articulated mirror 54 serves to "steer" the reading spot to a desired location and then "reads" only the illuminated area, transmitting that information back to the read assembly 28.

In an alternative embodiment, as shown in FIG. 3, a first articulated mirror 54' is provided which is mounted on a central pivot member 58', and is driven about an axis orthogonal to the plane of the FIGURE and in the clockwise and counter-clockwise direction by a first driver 60' that is coupled to the mirror 54' at the end of a long axis.

A second driver 60" is coupled to one end of a third mirror 54" for imparting rotational motion to the third mirror 54" about the long axis that is in the plane of the FIGURE.

In operation, the first driver 60' permits translation of the beams in the "radial" direction to permit "fine" tracking of the information channel. The second driver 60" is used to translate the beam in the circumferential direction, to provide time synchronization, if desired, and to compensate for eccentricity.

In other embodiments, the problem of time synchronization can be handled mathematically, as a step in the process of electronically compensating for eccentricity of the disc 20 and in such embodiments, only the single articulated mirror is used.

Turning next to FIG. 4, there is shown a preferred embodiment of the optical detector assembly 40 which utilizes some of the electronics of the Munro patent, supra. As shown in FIG. 4, the returned optical image 38 is directed to impinge upon a photocell 70 when a channel is being tracked properly, with the spot on the outer half of the track, a predetermined output signal is generated. The output of the photocell 70 is applied to a comparator 72. An adjustable bias 74 is applied to the other input of the comparator 72 and is adjusted to provide a null when the predetermined output signal is being applied. The error signals resulting from drift can be integrated, and the output of the integrator can be applied to an appropriate circuit to urge the movable playback assembly 10 relative to the center of the disc 20. The error signal is also used to apply a signal directly to the mirror driver 60 of FIG. 2 to urge the beam to follow the track.

If, however, the track is not being followed properly, depending, of course, upon the characteristics of the disc surface, a condition will be presented in which the energy impinging upon the photocell 70 will be different than the bias provided by bias circuit 74, and accordingly, the error signal of appropriate polarity will be provided to correct the position of the light spot relative to the information channel. The intergrator output then is applied to the movable playback assembly 10, and if the bias signal is greater, a forcing function is generated tending to send the spot toward the periphery of the disc. If the received signal is greater, the spot is directed to the center of the disc. As the spot follows the spiral track properly, the differential output tends towards the null. For this example, it is assumed that an appropriate mechanism drives the rotatable element 24 so that the arm moves in the radial direction at a predetermined rate. The output of the integrator would then provide a correcting signal tending to correct the rate at which the arm is moving toward the center. Alternatively, if the arm is to be driven entirely by the output of the integrator, the convention observed is substantially immaterial. If the bias signal being greater urges the spot toward the center of the disc, then the spot will follow the track on the "inner" edge. On the other hand, if a greater bias signal drives the spot toward the periphery, then the spot will follow the outer edge of the track. In either case, the error signal, when integrated, will provide an appropriate forcing function to the arm driver circuits so that the arm generally follows the track.

In FIG. 5, there is illustrated the prior art optical detector electronics utilized and shown as FIG. 10 in the previously issued Gregg, et al., U.S. Pat. No. 3,530,258, assigned to the assignee of the present invention. For convenience, the same reference numbers are used in Gregg, et al. and herein. A pair of photo detectors 96, 98 are employed which, in combination, provide an additive information signal and, when differenced, an error signal which controls servo elements that redirect the reading elements. As applied to the present invention, the radial error signal could be applied to either of the drivers 60, 60' of the articulated mirror assemblies of FIGS. 2 and 3, respectively.

As shown in FIG. 5, a dual photo detector has two sections 96, 98 whose outputs are applied to respective amplifiers 100, 101. The outputs of the amplifiers 100, 101 are summed in a summing network 106. The output from the summing network represents the sum signal from the two photo detector sections 96, 98 and constitutes the modulated signal output of the transducer.

The signal amplitude from the first photo detector section is applied to a detector 102, and this detector produces a negative unidirectional signal representative thereof. The signal amplitude from the second photo detector section is applied to a detector 103, and the latter detector produces a negative unidirectional signal in response thereto. The two signals are added algebraically in a summing network 105 which produced an error signal.

In the present example, the resulting error signal is amplified in an amplifier 104, and it is applied to the circuits of FIG. 3 and driver 60'. The error signal applied to the driver 60' causes the mirror 54' to shift the beams in a radial direction with respect to the disc 20, as explained above. The direction and the amount of the shift depends on the polarity and the amplitude of the error signal, so as to maintain the spot in perfect registry with the recording track on the record 20.

The output signal from the summing network 106 is applied to appropriate video detection and reproducing circuitry such as is illustrated in FIGS. 17 and 18 of Gregg, et al., supra, and described therein.

The DC component of the output of the amplifier 104, when properly processed, may be used in several ways to move the pick-up arm of FIG. 1 across the disc 20 at very nearly the rate which makes the signal approach zero. One method is to integrate this component over short intervals until it reaches a predetermined value, at which it triggers a solenoid. This solenoid, in turn, actuates a light-duty friction ratchet which then turns the pick-up arm through a very small angle, as is taught in Gregg, et al., supra.

Another method, also suggested in Gregg, et al., supra is to use an inexpensive electric clock movement with a reduction gear to drive the arm continuously across the disc at a rate just slightly above 2 microns for each one-thirtieth of a second or revolution of the disc. In this case, the integrated signal of the first method is used to interrupt the motor voltage occasionally. To assist the process, the arm 16 of FIG. 1 may be biased slightly towards the center of the disc 20.

It will be apparent from the foregoing that, while particular embodiments of the invention have been illustrated and described, various modifications can be made without departing from the spirit and scope of the invention. Accordingly, it is not intended that the invention be limited, except as by the appended claims.

I claim:

1. An improved tracking system for use in an optical disc playback system for recovering information from a selected one of a plurality of information tracks provided on a reflective optical disc, the average reflectivity of any one of the information tracks being different from the reflectivity of the disc between the tracks, said playback system including: an optical system for directing a beam of radiant energy onto a reflective disc and for directing the radiant energy reflected by the disc to a detector; and beam steering means for moving the beam of radiant energy radially relative to the disc being read to follow a selected one of the information tracks, said improved tracking system controlling the beam steering means such that the beam impinges a predetermined edge portion of the track being read, said tracking system comprising:

a photocell detector arranged to receive all of the radiant energy of a beam reflected by the disc being read and to output a recovered signal proportional thereto;

comparator means for comparing the level of said recovered signal with a reference level and for generating an error signal having a first characteristic when the recovered signal indicates that the beam is impinging more than said predetermined edge portion of the track being followed, and having a second characteristic when the recovered signal indicates that the beam is impinging less than said predetermined edge portion; and, wherein further, said characteristic of the error signal is the polarity; and the amplitude of the error signal is proportional to the difference between the recovered signal level and the reference level.

2. The tracking system as claimed in claim 1, wherein the error signal is coupled to the beam steering means to control the position of the beam.

3. The tracking system as claimed in claim 2, further comprising:

integrator means for integrating the error signal; and carriage means for moving the beam steering means radially under control of the output of said integrating means.

4. The tracking system as claimed in claim 2, further comprising:

means for generating a drive signal;

carriage means, responsive to said drive signal, for moving said beam steering means radially to cause the beam to generally scan successive ones of said plurality of tracks, said beams steering means being responsive to said error signal to correct the radial position of the beam with respect to deviations of the radial position of the beam from a prescribed position relative to a track being scanned.

5. The tracking system as claimed in claim 4, wherein said drive signal is selected such that the beam is caused to scan said successive ones of said plurality of tracks at a scan rate which ensures a constant rate of recovery of the information recorded in said tracks.

6. The tracking system as claimed in claim 1, wherein said reference level is fixed.

7. The tracking system as claimed in claim 1, wherein said reference level is variable.

* * * * *